US009794286B2

(12) United States Patent
Otsuka et al.

(10) Patent No.: US 9,794,286 B2
(45) Date of Patent: Oct. 17, 2017

(54) NETWORK DEVICE, AND DATA SENDING AND RECEIVING SYSTEM

(71) Applicant: HITACHI AUTOMOTIVE SYSTEMS, LTD., Hitachinaka-shi, Ibaraki (JP)

(72) Inventors: Satoshi Otsuka, Tokyo (JP); Tasuku Ishigooka, Tokyo (JP); Fumio Narisawa, Tokyo (JP); Kazuyoshi Sasazawa, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 128 days.

(21) Appl. No.: 14/763,597

(22) PCT Filed: Dec. 20, 2013

(86) PCT No.: PCT/JP2013/084209
§ 371 (c)(1),
(2) Date: Jul. 27, 2015

(87) PCT Pub. No.: WO2014/115455
PCT Pub. Date: Jul. 31, 2014

(65) Prior Publication Data
US 2015/0358351 A1   Dec. 10, 2015

(30) Foreign Application Priority Data

Jan. 28, 2013   (JP) ................... 2013-012772

(51) Int. Cl.
*H04L 12/40*   (2006.01)
*H04L 29/06*   (2006.01)
(Continued)

(52) U.S. Cl.
CPC ...... *H04L 63/1466* (2013.01); *H04L 12/4625* (2013.01); *H04L 12/66* (2013.01);
(Continued)

(58) Field of Classification Search
CPC . H04L 2012/40215; H04L 2012/40273; H04L 9/005
See application file for complete search history.

(56) References Cited

U.S. PATENT DOCUMENTS 6,357,014 B1   3/2002   Correia
9,225,544 B2   12/2015  Mabuchi et al.
(Continued)

FOREIGN PATENT DOCUMENTS

EP   0 886 412 A1   12/1998
EP   1 768 031 A1   3/2007
(Continued)

OTHER PUBLICATIONS

Tobias Hoppe et al. "Security Threats to Automotive CAN Networks—Practical Examples and Selected Short-Term Countermeasures", Sep. 22, 2008, Computer Safety, Reliability, and Security; [Lecture Notes in Computer Science], Springer Berlin Heidelberg, pp. 235-248.
(Continued)

*Primary Examiner* — Ellen Tran
(74) *Attorney, Agent, or Firm* — Volpe and Koenig, P.C.

(57) ABSTRACT

In order to detect and prevent attacks in which the network is infested with unauthorized data to cause malfunction, the invention aims, on the basis of network cycle information, to detect errors and to prevent unauthorized data forwarding in a network system such as a vehicle-mounted network. This network device is provided with a communication unit which receives data, a time management unit which manages the reception time at which data is received, and a control unit which processes data. If, for received data used as a reference, first data is received having the same identifier and a reception interval shorter than a prescribed cycle, the control unit waits to receive data having the same identifier as the first data from the reception time of the (Continued)

received data used as a reference up until the prescribed cycle has elapsed, and if during this interval second data is received having the same identifier as the first data, the control unit determines that an error has occurred and performs cycle abnormality detection processing.

7 Claims, 11 Drawing Sheets

(51) Int. Cl.
*H04L 12/46* (2006.01)
*H04L 12/66* (2006.01)

(52) U.S. Cl.
CPC *H04L 63/1416* (2013.01); *H04L 2012/40215* (2013.01); *H04L 2012/40273* (2013.01)

(56) References Cited

U.S. PATENT DOCUMENTS

| | | | |
|---|---|---|---|
| 2006/0015231 A1* | 1/2006 | Yoshimura | B60K 6/46 701/48 |
| 2007/0076593 A1* | 4/2007 | Sakurai | B60W 50/0205 370/219 |
| 2008/0008209 A1* | 1/2008 | Morimoto | H04L 12/40013 370/458 |
| 2008/0072289 A1 | 3/2008 | Aoki et al. | |
| 2008/0186870 A1* | 8/2008 | Butts | H04L 41/0659 370/252 |
| 2011/0035180 A1* | 2/2011 | Jin | H04L 12/66 702/122 |
| 2011/0160951 A1* | 6/2011 | Ishigooka | G07C 3/02 701/31.4 |
| 2011/0320081 A1* | 12/2011 | Ogura | B60L 1/00 701/22 |

FOREIGN PATENT DOCUMENTS

| | | |
|---|---|---|
| EP | 2 797 263 A1 | 10/2014 |
| JP | 2004-193903 A | 7/2004 |
| JP | 2007-312193 A | 11/2007 |
| JP | 2008-227591 A | 9/2008 |
| JP | 2008-236408 A | 10/2008 |
| JP | 2009-253557 A | 10/2009 |

OTHER PUBLICATIONS

Ulf E Larson et al. "An Approach to Specification-Based Attack Detection for In-Vehicle Networks", Intelligent Vehicles Symposium, 2008 IEEE, IEEE, Piscataway, NJ USA, Jun. 4, 2008, pp. 220-225.

Muter M et al. "A Structured Approach to Anomaly Detection for In-Vehicle Networks", Information Assurance and Security (IAS), 2010 Sixth International Conference on, IEEE, Piscataway, NJ USA, Aug. 23, 2010, pp. 92-98.

Extended European Search Report dated Aug. 24, 2016: EP Application No. 13872523.9.

* cited by examiner

[Fig. 1]
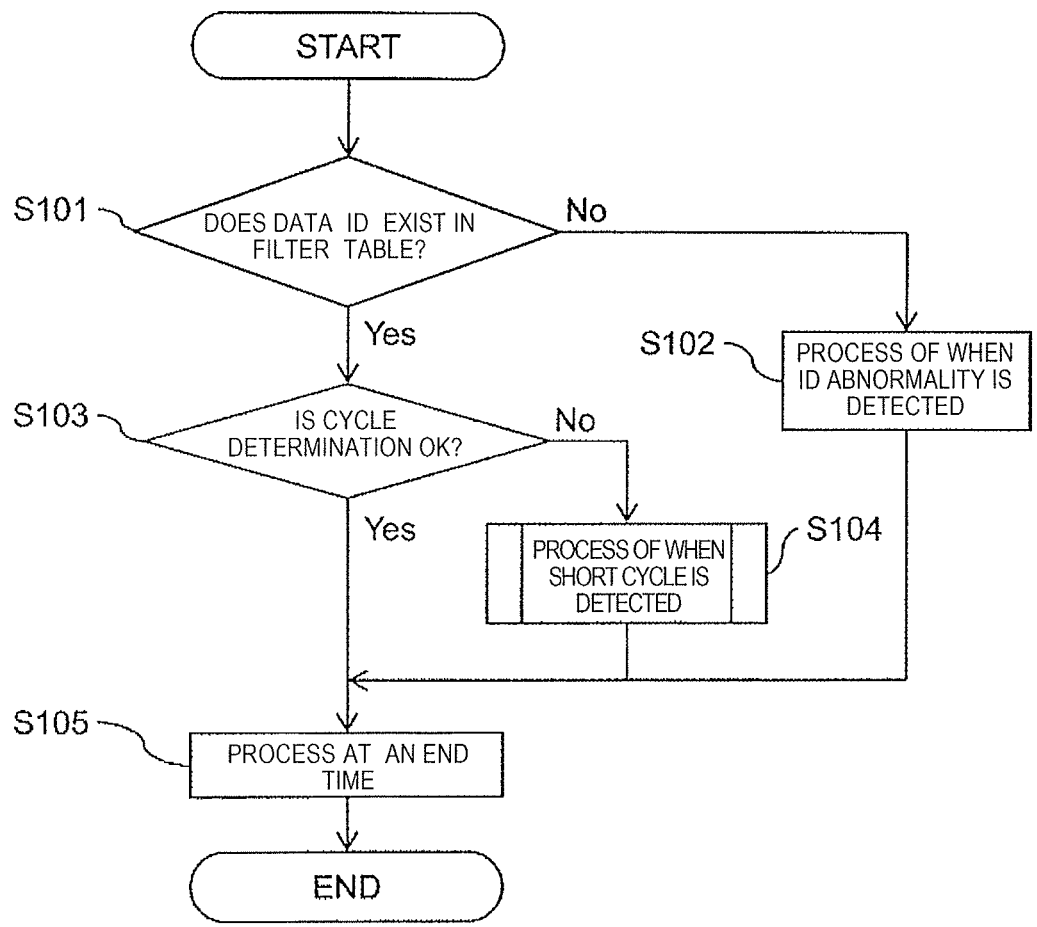

[Fig. 2]
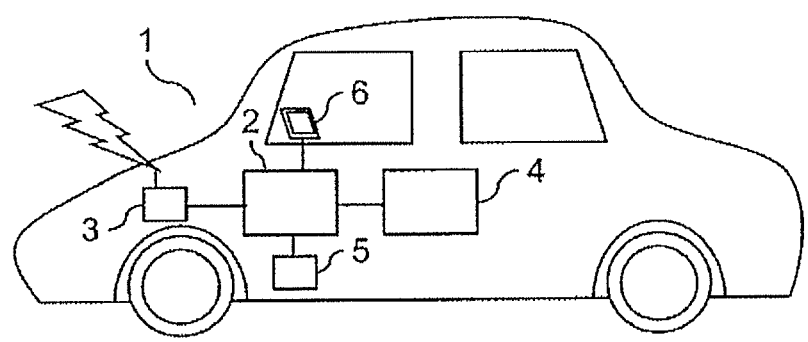
[Fig. 3]
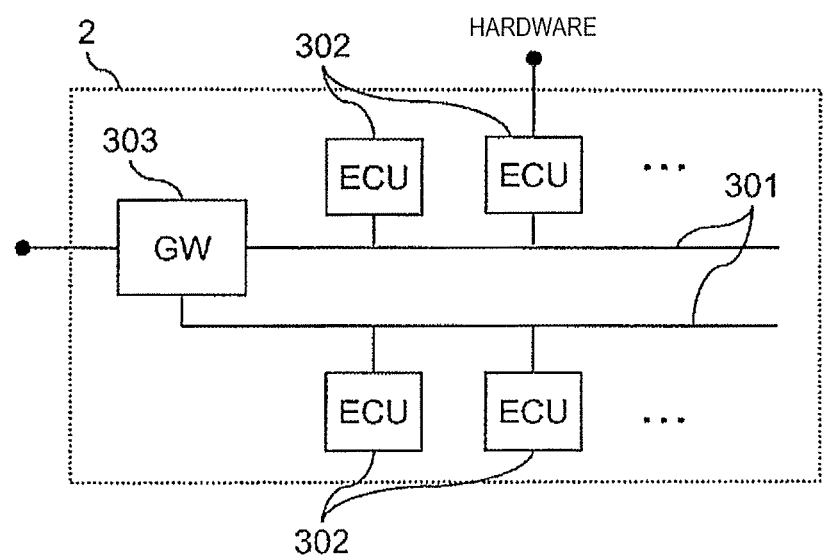

[Fig. 4]
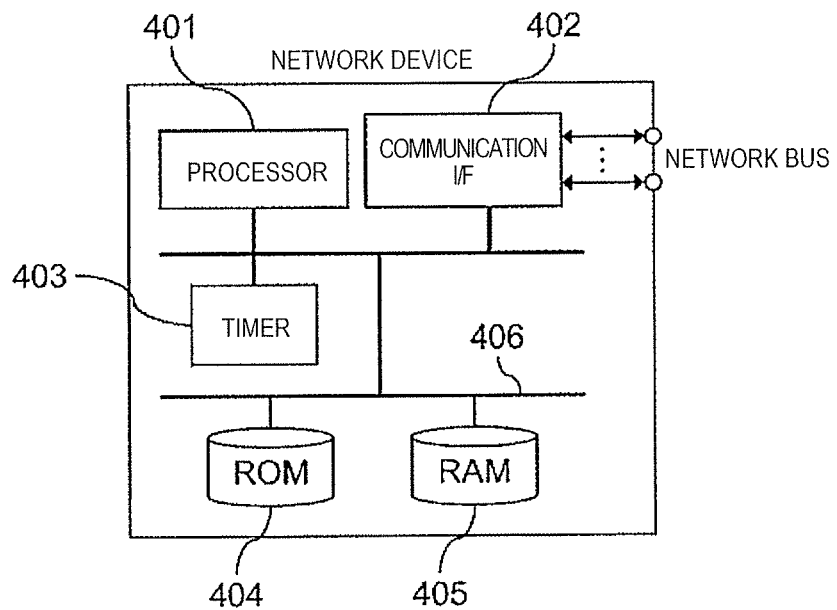
[Fig. 5]
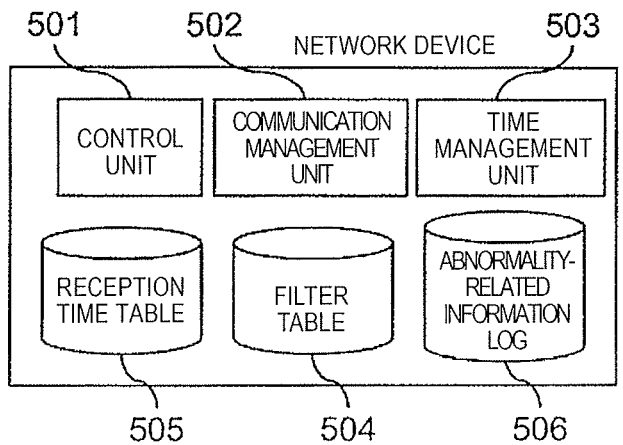

[Fig. 6]
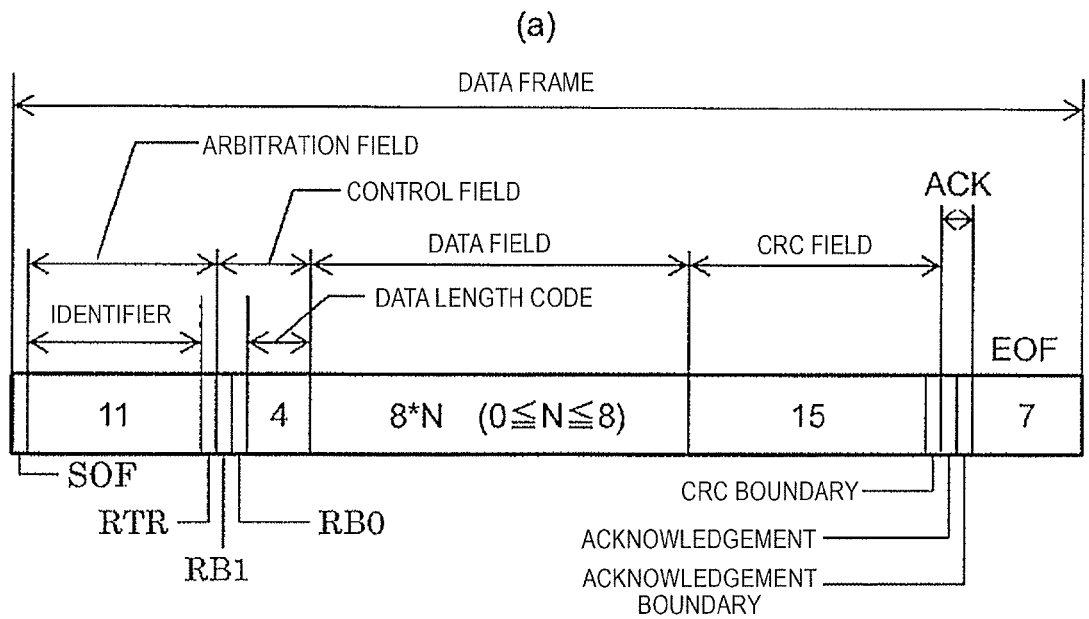
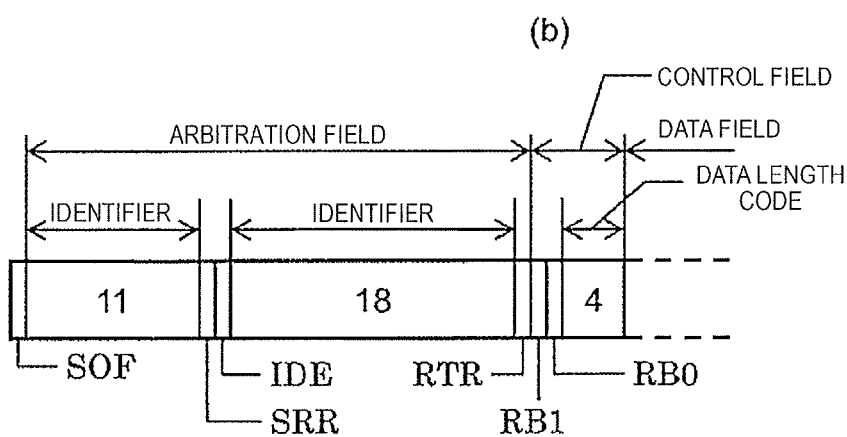

[Fig. 7]
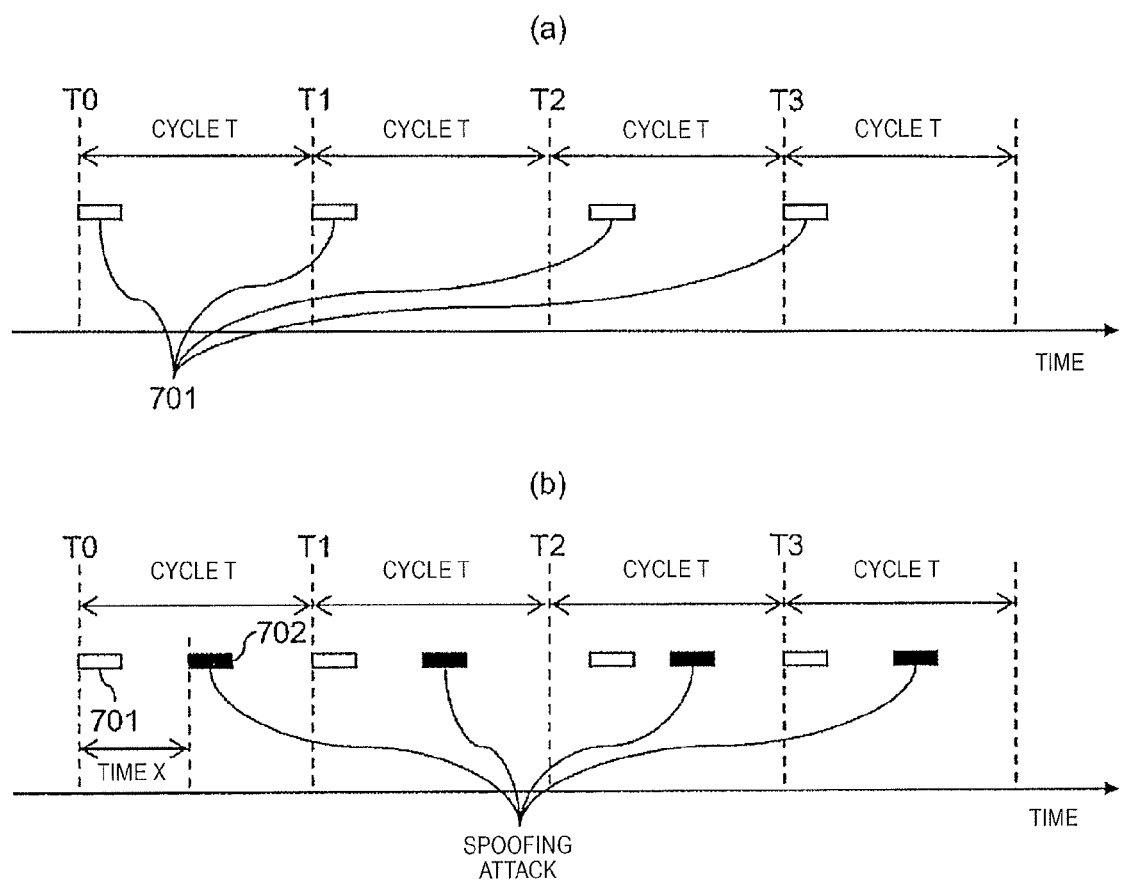

[Fig. 8]
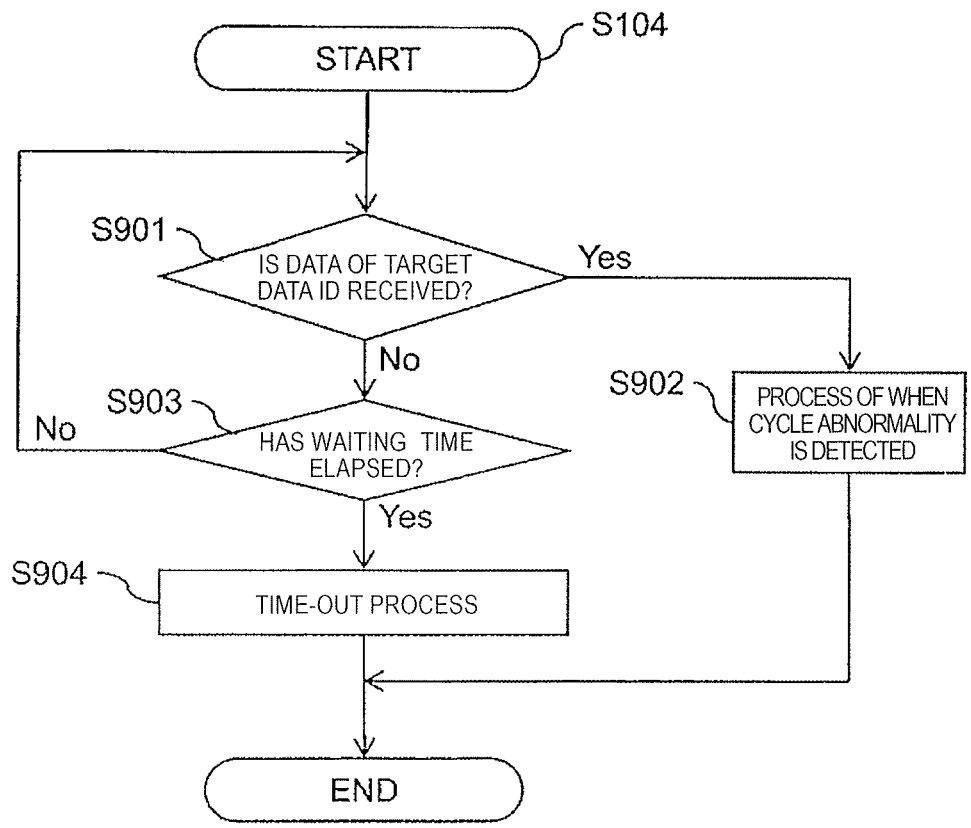
| DATA ID | CYCLE [ms] | DATA GENERATION BUS ID |
|---|---|---|
| 0x001 | 10 | A |
| 0x101 | 10 | A |
| 0x200 | 100 | B |
| ⋮ | | |
| 0x700 | 10 | B |
FILTER TABLE 504
[Fig. 9]

[Fig. 10]
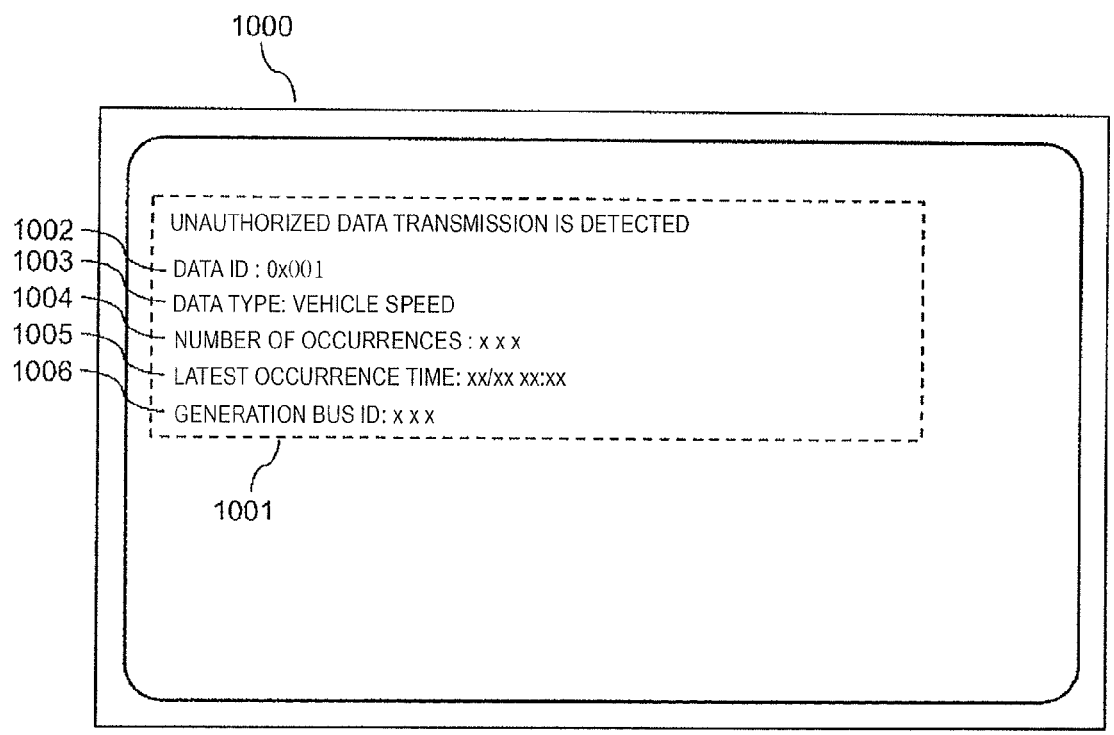

[Fig. 11]
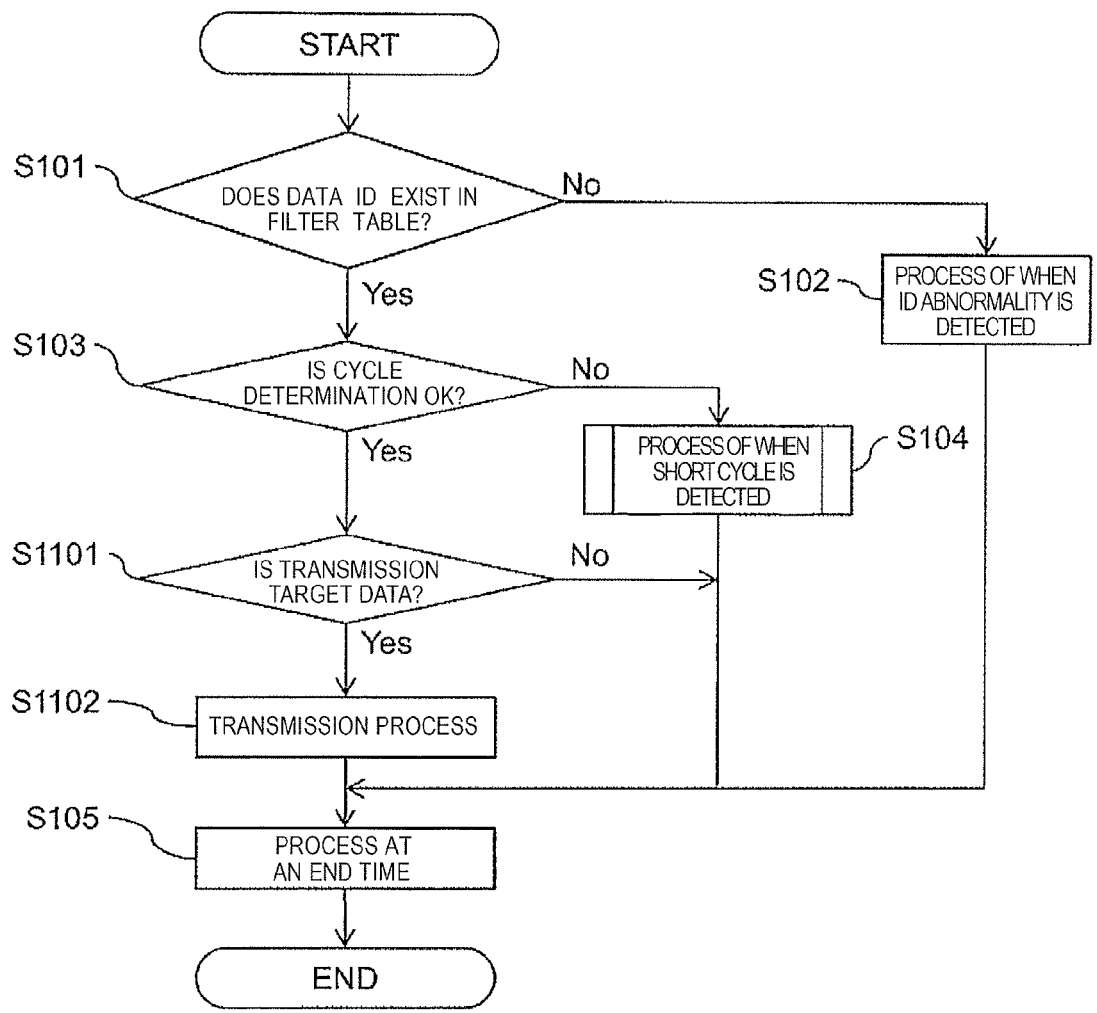

[Fig. 12]

| DATA ID | CYCLE [ms] | DATA GENERATION BUS ID | DATA TRANSFER DESTINATION BUS ID |
|---|---|---|---|
| 0x001 | 10 | A | B |
| 0x101 | 10 | A | - |
| 0x200 | 100 | B | A |
| ⋮ | | | |
| 0x700 | 10 | B | - |

FILTER TABLE 504

[Fig. 13]

| DATA ID | PREVIOUS RECEPTION TIME |
|---|---|
| 0x001 | 000100 |
| 0x101 | 000103 |
| 0x200 | 000200 |
| ⋮ | |
| 0x700 | 000101 |

RECEPTION TIME TABLE 505

[Fig. 14]
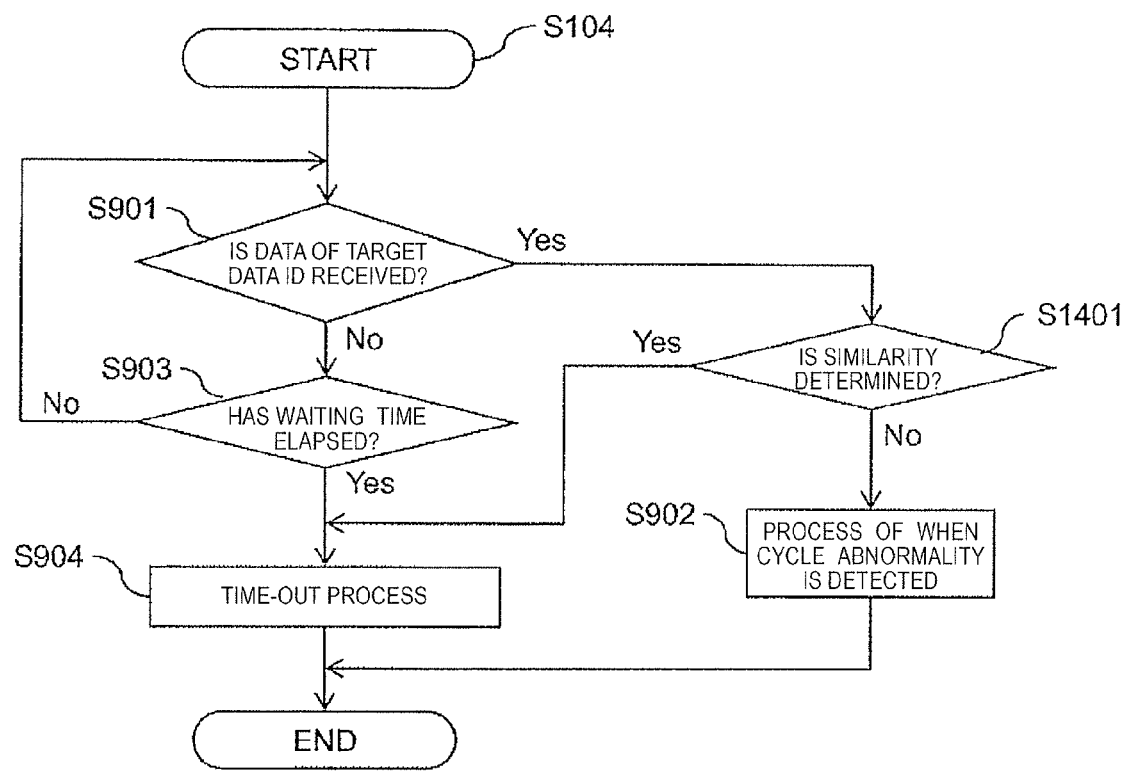

[Fig. 15]

| DATA ID | CYCLE [ms] | DATA GENERATION BUS ID | NORMAL RANGE | DIFFERENCE UPPER LIMIT |
|---|---|---|---|---|
| 0x001 | 10 | A | 0~300 | 5 |
| 0x101 | 10 | A | -100~40 | 10 |
| 0x200 | 100 | B | -10~10 | 2 |
| ⋮ | | | | |
| 0x700 | 10 | B | 0~1 | 1 |

FILTER TABLE 504

| DATA ID | NUMBER OF OCCURRENCES | LAST OCCURRENCE TIME | OCCURRED BUS ID |
|---|---|---|---|
| 0x001 | 0 | xxxxxx | A |
| 0x101 | 10 | yyyyyy | A |
| 0x200 | 1 | zzzzzz | B |
| ⋮ | | | |
| 0x700 | 0 | aaaaaa | B |

ABNORMALITY-RELATED INFORMATION LOG 506

NETWORK DEVICE, AND DATA SENDING AND RECEIVING SYSTEM

TECHNICAL FIELD

The present invention relates to a network device, and a data sending and receiving system.

BACKGROUND ART

Since JP-A-2008-236408 provides an information processing apparatus that detects a bus in which communication is abnormal because there is an ECU transmitting an error frame, and specifies the ECU connected to the bus and having an abnormal transmission cycle of a message frame, as a technology which detects communication abnormality and controls the relay of communication, and a relay apparatus is described which is connected to a plurality of ECUs connected through a multiplex communication bus through a relay connection unit, the relay connection unit relaying the communication of the ECUs, in which the relay connection unit includes a counter which is means for detecting communication abnormality and counts the number of message frames m received from the ECUs through the bus, for each ID (identifier) that is assigned to each message frame, and counter value check means for determining whether or not the communication of a message frame is abnormal by comparing the number counted by the counter with a reference value per unit time that is set in advance.

A relay apparatus described in JP-T-2007-528621 is configured to detect unauthorized access and disconnect a communication channel, and in order to secure another communication channel, the relay apparatus determines whether or not unauthorized access is detected by verifying a communication header of a received packet, based on an access pattern DB, identifies an in-vehicle communication apparatus of a transmission source of the packet when it is determined that unauthorized access is detected, and transmits a control signal for disconnecting the connection of the in-vehicle communication apparatus. Further, the relay apparatus transmits the control signal, and secures a communication channel through another in-vehicle communication apparatus by updating a channel control table.

CITATION LIST

Patent Literature

PTL 1: JP-A-2008-236408
PTL 2: JP-A-2004-193903

SUMMARY OF INVENTION

Technical Problem

There is a problem of an unauthorized attack (such as a spoofing attack which will be described later) causing an abnormal operation of a device by an unauthorized device transmitting unauthorized data through a network.

When applying the technology of PTL 1 to communication abnormality caused by such an unauthorized attack, the abnormality is determined by comparing the transmission cycle of a message frame with the lower limit value of a reception cycle reference value, and cycle information is compared with a normal value. Further, according to the technology of PTL 2, unauthorized access is detected based on header information of the received data.

However, a method for responding to the spoofing attack is not considered in PTL 1. Since a header is impersonated in the spoofing attack, it is not possible to detect the spoofing attack by the method of PTL 2.

The invention has been made in view of the above circumstances, and an object is to detect and defend against spoofing attacks.

Solution to Problem

In order to solve the above problems, at the time of occurrence of a spoofing attack, a data transmission cycle of data having the same identifier is shorter than a design cycle, such that a network device determines a reception cycle of data, detects the occurrence of an unauthorized attack in a case of receiving data at a cycle shorter than the design cycle, and performs defense operations against the attack (fail-safe, unauthorized transfer prevention, disposal of data, recording of a state, notifying a user or other systems of warning, and the like).

Advantageous Effects of Invention

According to the invention, when an unauthorized attack (for example, a spoofing attack which will be described) occurs on the network, it is possible to perform a defense operation and respond to the unauthorized attack.

Further, an erroneous detection reduction at the time of detecting the unauthorized attack and a load reduction at the time of checking data become possible.

BRIEF DESCRIPTION OF DRAWINGS

FIG. 1 is a flow chart illustrating a cycle determination process in a control unit at a time of data reception.
FIG. 2 is an example of a network system.
FIG. 3 is a configuration diagram of the network system.
FIG. 4 is a configuration diagram of a network device.
FIG. 5 is an example of a software module configuration of the network device.
FIG. 6 is an example of a data structure of a communication protocol on a network.
FIG. 7 is an example of data transmission and a spoofing attack on a network.
FIG. 8 is an example of a filter table.
FIG. 9 is a flow chart in the control unit at a time of short cycle detection.
FIG. 10 is an example of a message information display screen in a cycle abnormality notification process.
FIG. 11 is a flow chart in the control unit at a time of data reception in a second example.
FIG. 12 is an example of a filter table in a third example.
FIG. 13 is an example of a reception time table.
FIG. 14 is a flow chart of a process occurring when a short cycle is detected, in the second example.
FIG. 15 is an example of a filter table in the second example.
FIG. 16 is an example of an abnormality-related information log.

DESCRIPTION OF EMBODIMENTS

Below, the details of the invention will be described, with an apparatus and a system in a network such as an in-vehicle network performing periodical data transmission and reception, as examples of the preferred embodiments (examples) of the invention. Although the invention is suitable for an in-vehicle network device and a data sending and receiving system in an in-vehicle network, the invention is also applicable to others besides the network device and the data sending and receiving system.

Example 1

<Configuration of Network System>

FIG. 2 illustrates an outline of a control system provided with a network system having a network device employing the invention.

A control system 1 provided inside the vehicle includes a network system 2 configured with an in-vehicle network (Controller Area Network (CAN), FlexRay (registered trademark), Ethernet (registered trademark), and the like), a wireless communication unit 3 that performs wireless communication with devices outside of the control system 1 (for example, communication using a mobile phone, and communication using the protocol such as wireless LAN and WAN), a network system 4 using a protocol different from or the same as that of the network system 2, a wired communication unit 5 that includes a diagnostic terminal such as an on board diagnosis (OBD) terminal, and an external connection terminal such as an Ethernet terminal, an external recording medium (for example, a USB memory, an SD card, and the like), and performs an access to the network system 2 by wired connection through the external connection terminal, and an output device 6 which is connected to the network system 2 in a wired or wireless manner, receives data sent from the network system 2, and displays or outputs information such as message information (for example, a video, or sound) based on the received data.

The network system 2 is connected to devices such as the network system 4, the wireless communication unit 3, the wired communication unit 5, and the output device 6, and transmits and receives information between respective devices.

FIG. 3 illustrates an internal configuration of the network system 2. The network devices on the network system are connected to a network bus 301, and the network bus 301 is, for example, a CAN bus, or the like. Electronic control unit (ECU) 302 that is connected to hardware, is not illustrated, and performs control of and data transmission and reception with the hardware on the network bus, and a gateway (hereinafter, GW) 303 that connects network buses and performs data transmission and reception between the respective network buses is connected to the network bus 301.

The GW 303 may be an ECU having a GW function, the ECU 302 may be a GW having a function of an ECU, and the GW 303 and the ECU 302 may each have both functions.

In addition, the devices that are connected to a network bus, such as the GW 303 and the ECU 302, are generically referred to as network devices. Each network device may control the hardware that is connected to the network device. For example, an actuator, not illustrated, is connected to the ECU 302, and the ECU 302 controls a control target by manipulating the actuator. The output unit 6 is connected to the network bus, and the network device controls the output device 6 through the network bus as will be described below.

The GW 303 is connected to a plurality of network buses, an ID is given to each network bus during an internal process of the GW 303, and thus it is possible to identify which network bus for the process is used, from this ID. The ID for performing this identification is called a bus ID. The bus ID is also called a "Channel ID".

In the example of FIG. 3, a bus-type connection used in the CAN is illustrated, as the topology of the network system 2, but the invention is also similarly applicable to different topologies such as a star-type, a mesh-type, and a ring-type.

FIG. 4 is a diagram illustrating an internal configuration of the GW 303 which is a network device according to the invention. The GW 303 includes a processor 401 such as a CPU that has a storage element such as a cache or a register and executes control, a communication I/F 402 transmitting and receiving data with a plurality of network buses 301, a timer 403 that manages time and timing using a clock, that is not illustrated, a read only memory (ROM) 404 that stores programs and non-volatile data, a random access memory (RAM) 405 that stores non-volatile data, and an internal bus 406 used for communication in the inside of the network device.

The internal configuration of the ECU 302 is also similar to the internal configuration of the GW 303, but is different in that without a function of the GW, the ECU 302 does not perform a data transfer process between network buses.

Next, FIG. 5 illustrates a configuration of a software module running on the network device. In the network device, a filter table 504 to be described later and a reception time table 505 to be described later are stored in the RAM 405. Further, the processor 401 executes respective modules such as a communication management unit 502 that manages the operation and status of the communication I/F 402 and issues an instruction to the communication I/F 402 through the internal bus 406, a time management unit 503 that obtains information about time and performs control by managing the timer 403, and a control unit 501 that analyzes data obtained from the communication I/F 402, and performs overall control of the software modules. The network device also includes an abnormality-related information log 506 that records the abnormality-related information to be described later. The abnormality-related information log 506 is Recorded in the RAM 405.

The configuration of FIG. 5 illustrates the operation concept of the processor 401, and the processor 401 appropriately acquires information necessary for the operation from the ROM 404 and the RAM 405, and performs the operation.

<Example of Network Protocol>

FIG. 6 illustrates an example of a data structure according to a communication protocol used in the network bus 302. FIG. 6 illustrates the data structure of a frame in the CAN communication protocol. The numerical values illustrated in FIG. 6 represent the number of bits in each field constituting the frame.

The network device connected to the same bus in CAN performs communication by setting the bus signal to the dominant (0) during transmission, and detecting the dominant (0) or the recessive (1) of the bus signal during transmission or reception.

Start of frame (SOF) indicates the starting position of the frame, and is also used to synchronize the frame.

An identifier (ID) indicates an ID of data transmitted in the frame (hereinafter, data ID), and the type of data that is transmitted in the frame can be identified by the data ID.

A portion that is configured with the identifier (ID) and a remote transmission request (RTR) bit is referred to as an arbitration field, and the arbitration of a bus is performed by using the value in the arbitration field.

RB1 and RB0 in the control field are reserved bits, and are set to dominant in the example of the format of FIG. 6(a). In addition, a data length code represents a data length (number of bytes) of the data field. However, if the value of RB0 is set to recessive, the value represents that the arbitration field has an extended format as illustrated in FIG. 6(b), and the identifier (ID) can be represented by 29 bits in this extended format. The structure of the data field and the subsequent fields following the control field in the extended format is the same as FIG. 6(a).

The data field represents the contents of data to be transmitted, and data of N bytes is transmitted in a variable length.

The CRC of the frame is input to the CRC field, and a CRC boundary is always set to recessive and transmitted for the acknowledgment boundary.

When a receiving node (in this example, the ECU 302 or the GW 303) properly receives data, it returns a response for the transmitted data by setting the bit in the acknowledgment to dominant for the response.

The end of frame (EOF) indicates the end of the frame, and has 7 recessive bits.

In the CAN bus, the network devices perform transmission and reception of data with each other in the format described above.

In the in-vehicle network, a specific network device periodically transmits a value that the network device has observed (for example, the value of a sensor) to the network, and performs a process of notifying other network devices of the state (a value observed by the sensor).

In the CAN, during the transmission of data, arbitration is performed in the arbitration field, and if a plurality of network devices starts transmitting at the same time, a network device with a low-priority stops the transmission. In the CAN standard, a data frame having a large ID, in other words, a data frame in which less dominant bits have been transmitted during the arbitration cycle is defined to have a lower priority. Therefore, even if each network device intends to transmit data periodically, despite being capable of transmitting data at the transmission timing of data, when interruption occurs in the transmission process as the result of the arbitration in the arbitration field, or another network device has already transmitted data at the transmission start timing, it is not possible to transmit data and there is a possibility of deviation in the transmission cycle. The state in which the transmission timings of data overlap each other, or a bus is used when data is intended to be transmitted is called collision.

Here, the CAN has been described as an example, but data transmission and reception is periodically performed, for example, in a protocol such as Flexray (registered trademark). Moreover, in the example such as Ethernet, data transmission and reception are periodically performed in a different format, a process of periodically sending information is performed, and it can be similarly applicable to the invention.

<Data Transmission and Reception Process in Communication I/F>

As a data reception process of the communication I/F 402, for example, the processor 401 reads a data ID that needs to be received in the network device, which is set at a design time, from the filter table 504, and specifies the data ID to the communication I/F 402. The communication I/F 402 that has received the specified data ID that needs to be received monitors signals transmitted on the network bus 301 to which the network device is connected, and performs a data reception process of receiving the data frame having the data ID, and notifying the processor 401 of the reception of the data and the data of the data frame, when a data frame having a specified data ID is transmitted on the network bus 301.

Meanwhile, as a data transmission process in the communication I/F 402, when receiving a data transmission processing instruction and data transmitted from the processor 401, after adding necessary information, data is transmitted to the network bus 301 in the data format conforming to a network protocol.

<Output Method of Message Information in Output Device>

A method of outputting message information to the output device 6 will be described. The output device 6 is connected to the GW 303 and the ECU 302, through a communication channel such as a dedicated line or a network bus 301, receives for example, a data frame in which data of data ID 0x300 is defined as a warning screen display request and data of data ID 0x301 is defined as cycle abnormality log information, described later, displayed on the warning screen, as data of a data format defined by the network protocol described above, and which are transmitted from the GW 303 and the ECU 302, from such a communication channel, creates image information such as diagrams and text information corresponding to the data, and displays the image information on a display included in the output device 6.

Alternatively, for example, it is defined that data of data ID 0x302 is a warning lamp lighting request and a value stored in the payload of the data specifies a lighting pattern of a warning lamp, and the warning lamp may be lighted when the data is received.

Alternatively, for example, it is defined that data of data ID 0x303 is a warning sound output request and a value stored in the payload of the data specifies a pattern for warning sound, and when such data is received, the output device 6 may output the sound designated from among the sounds of sound patterns which are held therein, to the speaker.

By such output control, the output device 6 notifies the user of the status of the control system by outputting the message information about the state of the detected control system (in particular, abnormality occurrence).

<Example of Spoofing Attack>

Next, an example of a spoofing attack to be mainly defended against in the invention will be described with reference to FIG. 7.

FIG. 7(a) illustrates an example of a data transmission operation at a normal time, represents the transmission cycle of the data frame 701 with the elapse of time indicated on the horizontal axis, and represents the state in which the data frame 701 of the format illustrated in FIG. 6 is transmitted from a certain network device, for every predetermined cycle (T). For the sake of simplicity, here, a state is illustrated in which only the data frames with a certain data ID are transmitted. Here, it is illustrated that the delay occurs in the transmission time at time T2 due to a collision with a data frame with another data ID which is not indicated in FIG. 7(a).

FIG. 7(b) illustrates a state of data transmission when a spoofing attack is taking place. Although the data frame 703 transmitted by the spoofing attack has the same data ID as that of a normal data frame 702, the data frame 703 is transmitted at a timing different from the transmission timing of the original data frame 702, in the same cycle as the data frame 702. Therefore, the network device that receives data of this data ID cannot determine which of the data is correct, and there is a possibility of performing erroneous operations.

Due to such a spoofing attack, the generation cycle on the network bus of the data frame with a specific data ID is shorter than the original transmission cycle T, and the network device on the receiving side receives data, for example, at each time X or at each time T-X in FIG. 7 (*b*).

The first embodiment of the invention will be illustrated later. Here, an example is illustrated in which the invention is applied to the GW 303 in FIG. 3.

The data structure of the filter table 504 included in the GW 303 will be described with reference to FIG. 8. The filter table 504 stores a data ID 802 of a received data frame, and a data transmission cycle 803 (hereinafter, a predetermined cycle) for each data ID. Further, when a network device as the GW 303 is connected to a plurality of network buses, there may be data generation bus IDs 804 which are bus IDs of the network buses connected to the network devices transmitting data frames with respective data IDs. In the invention, a determination as to the presence or absence of the spoofing attack is performed based on these types of information. These types of information registered in the filter table 504 are determined at the time of design of the entire system, and are registered before the start of the system.

When the GW 303 receives the data frame by the communication I/F 402 from the network bus 301, the communication management unit 502 detects the reception. Then, the communication management unit 502 obtains the reception time of the data from the time management unit 503 at the timing of detecting the reception of the data frame, and notifies the control unit 501 of the content of the received data and the reception time of the data.

The control unit 501 which has received the notification from the communication management unit 502 performs a cycle determination process on the received data. FIG. 1 illustrates a flow chart of a cycle determination process. In the cycle determination process, first, a determination as to whether the data ID of the received data exists in the filter table 504 (S101) is performed. If the data ID of the received data does not exist in the filter table 504 (S101: No), since the data frame having the data ID which was not originally supposed to be transmitted is transmitted, a process occurring when ID abnormality is detected is performed (S102).

In a state of performing the process occurring when ID abnormality is detected S102, since data having the data ID that has not been assumed is transmitted on the network bus, it is determined that there is a high possibility of the occurrence of an unauthorized attack, it is regarded that abnormality of the ID has occurred, and a process occurring when abnormality is detected which will be described later is performed, as the process occurring when ID abnormality is detected.

In the determination as to whether or not the data ID of the received data is present in the filter table 504 at S101, if a data generation bus ID is present in the filter table 504, it is also checked whether or not the ID of the network bus that has received the data and the data generation bus in the filter table 504 match each other. Since this enables not only matching of the data IDs but also checking of the matching of the data generation buses, it is possible to recognize the data transmission from buses other than the network bus from which data has originally been transmitted, and it becomes easier to detect cycle abnormality.

In the process of step S101, if the data ID of the received data is present in the filter table 504 (S101: Yes), the process of step S103 will be performed next.

In the process of step S103, the control unit 501 calculates the reception cycle of the data frame indicated by the data ID of the received data by comparing the reception time included in the notification from the communication management unit 502 with the previous reception time of the same data ID that the control unit 501 has previously stored in the reception time table 505 in a process at an end time which will be described later, and performs a cycle determination of comparing the reception cycle from the calculation result with the cycle in the filter table 504. If it is determined to be abnormal, from the result of the cycle determination (S103: No), a process occurring when a short cycle is detected is performed (S104). The process occurring when a short cycle is detected will be described later.

The case where it is determined to be abnormal from the cycle determination refers to the case where the reception cycle which is calculated based on the previous reception time is less than the cycle of the corresponding data ID stored in the filter table 504. Here, in the comparison, in addition to direct comparison with the cycle in the filter table 504, the margin for error may be calculated and determination may be performed. Specifically, when the cycle stored in the filter table is 10 ms, a margin of 10% is obtained; and when the reception cycle is less than 9 ms, it is determined as a short cycle. Thus, even if the cycle is disturbed by collision or the like, it is less likely to be erroneously determined as a short cycle.

If it is determined to be normal by comparing the cycle resulting from the calculation with the filter table 504 (S103: Yes), the process at an end time (S105) is performed. As the process at an end time S105 here, the reception time of receiving the data ID is stored in the reception time table 505, as illustrated in FIG. 13, and is used as the previous reception time of the data indicated by the data ID. The reception time table 505 is configured to record the reception time of the data frame for each data ID (1301), and in the process at an end time, the reception time is recorded in the column of the previous reception time (1302) corresponding to the data ID.

In this way, the control unit 501 performs detection of a state in which the data frame is transmitted at a cycle shorter than the cycle which has been determined in advance.

<Process Occurring when Short Cycle is Detected>

Next, a process occurring when a short cycle is detected performed by the control unit 501 when a data frame transmission cycle is detected to be a short cycle in the cycle determination process will be described with reference to the flow chart illustrated in FIG. 9. The process occurring when a short cycle is detected is a process occurring when it is determined that the data frame having the same data ID has been received at a cycle shorter than the cycle which has been determined in advance, and determines whether or not the subsequent data frame having the same data ID is received within a certain period of time.

Thus, the control unit 501 waits for data reception of the data frame having the data ID for which a short cycle has been detected. Therefore, the control unit 501 monitors the data ID of the data frame of which notification is sent from the communication management unit 502, and performs a process occurring when cycle abnormality is detected which will be described later (S902), if notification of the reception of the data frame of the data ID for which a short cycle has been detected is sent (S901: Yes). If the data of the data ID for which a short cycle has been detected is not received (S901: No), the control unit 501 performs the process of FIG. 1 on the data frame of which notification of the reception is sent, and checks whether or not the waiting time has elapsed in the process of step S903.

When a short cycle (data reception at a cycle shorter than the assumed cycle) is detected, the waiting time represents a time up to the data reception time at a normal cycle that is assumed for the previous reception time which is a reference, and corresponds to a time of (cycle T−time X) in FIG. 7(b). Specifically, the waiting time can be obtained by a calculation expression (Equation 1) as follows.

Waiting time=cycle in filter table−(data reception time−previous reception time)   (Equation 1)

Similar to the case of the cycle determination, the calculation including a margin may be performed for the waiting time. For example, when the waiting time resulted from the calculation is 2 ms (for example, in the case of assuming reception at intervals of 10 ms, reception of data of the same data ID after 8 ms from the previous reception), 20% of the time of the cycle which is registered in the filter table is defined as the margin of the waiting time, rather than 2 ms obtained from the calculation, in consideration of the disturbance of the transmission cycle due to the occurrence of collision, and the waiting time may be 4 ms obtained by adding 2 ms corresponding to this margin. This makes it possible to adjust the time until the data frame transmitted at a normal cycle is received since a short cycle is detected, and to prevent an erroneous determination that there is no unauthorized data, when normal data cannot be received at a normal cycle due to collision or the like after abnormal data is received.

When the current time has not elapsed the waiting time (S903: No), the control unit 501 waits for a predetermined time process and performs step S901 again. When the waiting time has elapsed (S903: Yes), it performs a time-out process (S904).

In the time-out process S904, when the time-out occurs (when the waiting time has elapsed), there is a high possibility that the data that has been detected as having a short cycle is actually normal data for which only a cycle has been shortened due to disturbance on the transmission cycle on the network bus, and spoofing data has not been received, such that a process occurring when data is determined to be received normally (for example, data transfer process) is first performed on the data determined as having a short cycle.

In this manner, the periodicity for a data frame with the data ID of the data that is detected to be a short cycle is checked, and it is checked whether there is no unauthorized data transmission.

As another calculation example of the waiting time, there is a case of storing the error in the previous time, and correcting the waiting time. For example, if the cycle in the filter table is 10 ms and the reception interval of data in the previous time is 12 ms, the reception interval of data in the subsequent cycle may be 8 ms in some cases, when the timing of transmission is constant. In order to avoid erroneous determination as a short cycle in that case, the waiting time is calculated as Equation 2, by using the previous reception error (in the above example, 12 ms−10 ms=2 ms).

Waiting time=cycle in filter table−(data reception timing−previous reception timing)−previous reception error   (Equation 2)

The calculation in this manner enables avoiding erroneous determination as a short cycle due to periodic disturbances caused by temporary collision.

With respect to the cycle that is registered in the filter table 504, other than registering in advance the cycle determined at the time of system design as described above, for example, it is also possible to receive data for a certain cycle of time (for example, about 10 seconds), and to register the cycle in the filter table 504 when a system starts up. For example, the processor 401 monitors the reception cycle of a data frame through the communication I/F 402 for a certain cycle of time since the recovery from the start-up or standby state, and registers the reception cycle in the filter table 504. By doing so, it becomes unnecessary to register in advance a design cycle in the filter table 504.

<Process Occurring when Cycle Abnormality is Detected>

As a process occurring when cycle abnormality is detected, a process occurring when abnormality is detected described later is performed, based on information indicating that the cycle is abnormal.

<Process Occurring when Abnormality is Detected>

As a process occurring when abnormality is detected is performed by the control unit 501, when the received ID is abnormal or the cycle abnormality is detected.

As examples of the process occurring when abnormality is detected, the following processes are performed: (1) discarding of the received data without processing it, (2) recording of abnormality type (ID abnormality and cycle abnormality) and the number of abnormality occurrences (a cumulative value) as abnormality log information, when the abnormality occurrence is detected, (3) implementation of an abnormality notification process for notifying of the abnormality, and the like.

<Message Information Output by Abnormality Notification Process>

In order to notify that the abnormality has occurred, for example, the network device that has detected abnormality notifies the output device 6 of abnormality-related information described later through the communication channel, and the output device 6 displays the abnormality-related information as message information indicating that the abnormality is detected. The output process of the message information is as described above.

FIG. 10 illustrates an example of message information display. FIG. 10 illustrates an example in which message information 1001 is displayed on the display 1000 provided in the output device 6. As the content of the message information, the displayed example represents information such as "data ID" (1002) that is a data ID of a data frame in which an abnormality is detected, "data type" (1003) representing a specific data type such as "vehicle speed" associated with the data ID, "number of occurrences" (1004) representing the number of abnormality occurrences as a cumulative value, "latest occurrence time" (1005) that is the most recent time that abnormality is detected, and "generation bus ID" (1006) that is a bus ID of a network bus in which abnormality is detected. The information indicated by the message information is referred to as abnormality-related information. It is possible to notify the user of the abnormality occurrence in a network and the details as a warning, by presenting the information.

<The Fail-Safe Implementation by Abnormality Notification Process>

As a process occurring when abnormality is detected at a time of other cycle abnormality detection, in order to make the entire network system be in a fail-safe state, the control unit 501 performs an abnormality notification process of transmitting a predetermined specific signal (warning signal) to the network bus 301. If the network device such as the ECU 302 or the GW 303 that has received the specific signal detects the occurrence of the cycle abnormality in the network, the network device performs, for example, a process of stopping the system after controlling the hardware under the control of the network device so as to be in a predetermined safe state, and notifying the other communication devices of the implementation of the fail-safe control, or the like. By doing so, it becomes possible to stop the system in a safe state when the cycle abnormality is detected.

If targets to which the network device having detected the cycle abnormality transmits a warning signal are network devices that are connected to the wireless communication unit 3, the wired communication unit 5, or a plurality of network buses, it is possible to make the entire system be in a fail-safe state by sending the notification to network buses other than the network bus that has detected the cycle abnormality, or other network systems.

<Recording to Abnormality Log Information>

In the process occurring when abnormality is detected, a network device that has detected abnormality, or a network device that has received the cycle abnormality notification process stores the abnormality-related information as abnormality-related information log 506 inside the network device. FIG. 16 illustrates the data structure of the abnormality-related information log 506. Here, in the abnormality-related information described above, the data ID of a data frame in which abnormality is detected is recorded in a data ID 1601, the accumulated number of times when abnormality occurs is recorded in the number of occurrences 1602, a time that has been determined to be abnormal is recorded in a last occurrence time 1603, and a bus ID of a network bus in which abnormality occurs is recorded in a occurred bus ID 1604, respectively, thereby the abnormality-related information log is configured.

<Response Against Communication Channel Saturation Attack Due to Discarding of Received Data>

Since the received data is discarded without being processed as an example of the process occurring when abnormality is detected, when cycle abnormality occurs, for example, even when a large amount of data with normal identifier is transmitted by communication channel saturation attack such as denial of service (DoS), and the like, data transmitted at an interval of a predetermined cycle or less is discarded, and thus it becomes possible to prevent attacks.

Example 2

Next, as Example 2, an example will be described in which the presence or absence of cycle abnormality is performed on consideration of a similarity determination process of comparing the content of received data in a process occurring when a short cycle is detected.

The configuration of a network device in Example 2 is the same as in the case of Example 1, and the process occurring when a short cycle is detected in the control unit 501 is a process of a flow chart illustrated in FIG. 14 instead of the process of FIG. 9.

In Example 2, as illustrated in FIG. 14, in the process occurring when a short cycle is detected S104, when the notification of the reception of the data frame having the data ID of a determination target is sent (S901: Yes), a similarity determination process of comparing the content of the data of a data frame at a time of cycle abnormality detection with that of a data frame that has been received until the waiting time has elapsed since then is performed (S1401). When the determination result is normal (S1401: Yes), the process occurring when cycle abnormality is detected S902 is not performed, and the time-out process S904 is performed regarding that normal data frame is received.

The meaning that the determination result from the similarity determination process is normal is that, for example, the difference value between the data fields in two data frames is equal to or less a predetermined certain amount (difference upper limit) or a constant ratio, the indicated states are the same (the statuses representing ON/OFF are both ON, or the like), and the difference value is within the range of the value determined based on the data type that the data field means such as a design reference value (a normal range). In this case, even if both pieces of data are processed normally, it is considered that abnormal operation does not occur without causing a large change in the control state of the system, it is determined that the cycle is shortened cycle by collisions rather than spoofing attack, and the necessary process that is performed at a normal state is performed on the received data.

The determination result from the similarity determination process is abnormal in the case where the difference value is greater than the difference upper limit, the states (values) are not equal, any value is outside the normal range, and the like. In this case (S1401: No), it is determined that there is a concern that the control state of the system may change significantly by processing the received data, and there is a high possibility of occurrence of an abnormal operation and a spoofing attack, such that data is discarded without being processed, and the process occurring when cycle abnormality is detected S902 is performed.

FIG. 15 illustrates the data structure of the filter table 504 in Example 2. In example 2, the filter table 504 stores values to be compared with the difference value of data field used in the similarity determination process. As the value to be compared with the difference value of data field, there is a design reference value (normal range) 1501, and a difference upper limit 1502. These values are determined in advance for each data ID at the time of system design, for example, in the case of data of the data type "vehicle speed", a normal range: 0 to 300 and a difference upper limit: 5 are determined in advance for the data ID: 0x001 corresponding thereto, and registered in the filter table 504.

After cycle abnormality is detected in this way, the content of data of the data frame with the corresponding data ID is checked, and the occurrence of cycle abnormality is determined, such that it is possible to detect the cycle abnormality while preventing erroneous detection due to the collision occurred at the normal time.

Moreover, since the process of checking the content of data is performed only after the cycle abnormality detection, a process of always checking the content of data in the normal state is not required and it becomes possible to reduce the processing load.

Example 3

Next, the process occurring when cycle abnormality is detected when the GW 303 performs data transfer and an unauthorized transfer prevention process associated with this will be described. Example 3 is different from Example 1 in that the control unit 501 performs a transfer process S1102 after performing the process occurring when cycle abnormality is detected as illustrated in FIG. 11 and the filter table 504 contains the information about the data transfer destination bus ID as illustrated in FIG. 12. The following description will be given regarding the process in the control unit 501 with reference to the flowchart in FIG. 11.

The processes of S101 to S104 when the control unit 501 receives the notification of the data reception are the same as those of Example 1. The process of the cycle determination (S103) is performed in the same manner as Example 1, and if the cycle resulted from the calculation is determined not to be abnormal by comparing the cycle with that in the filter table 504 (S103: Yes), a determination as to whether or not the relevant data ID is data to be transferred (S1101). The determination as to whether or not the data ID is data to be transferred checks the value of the data transfer destination bus ID (1201) corresponding to the data ID of the received data, based on the filter table 504 illustrated in FIG. 12, and when the bus ID of the network bus of the transfer destination is described, the data is determined to be transferred. For example, in the example of the filter table 504 illustrated in FIG. 12, in the case of the data frame of data ID 0x001, the data transfer destination bus ID is set to 'B', such that it is considered that it is necessary to perform a transfer process of data frame on the network bus having the bus ID 'B', and the data is determined to be the transfer target data. Meanwhile, in the case of the data frame of data ID 0x101, there is no value in the data transfer destination bus ID, such that the data frame is determined not to be transfer target data and there is no need to perform a transfer process.

As a result of the above determination, if the received data is not transfer target data (S1101: No), the process proceeds to the process at an end time S105 without performing the transfer process of the data frame. Further, if the received data is determined to be the transfer target data (S1101: Yes), the process performs the transfer process S1102 and proceeds to the process at an end time. When the reception cycle is determined to be normal in step S103, the process is performed as described above.

Meanwhile, if the result from the process of the cycle determination is determined to be abnormal (S103: No), the process occurring when a short cycle is detected is performed (S104). The process of the control unit 501 in this case is the same as the case in Example 1, but the processes in the time-out process S904 are different. In the time-out process S904 in Example 1, with respect to data that is first determined as having a short cycle, a process occurring when the data is determined to be received normally (for example, data transfer process) is performed on the data. However, in the case of Example 3, with respect to reception data that is first determined as having a short cycle, a determination as to whether or not the reception data is transfer target data by the same determination process as in S1101 is performed, and when the reception data is determined to be the transfer target data, the data is transferred.

Thus, with respect to the data detected as a short cycle, data frame is not immediately transferred to another network bus, but is temporarily held in the GW 303, and thereafter, when cycle abnormality is detected, it is possible to prevent unauthorized data transfer by discarding the data.

Further, in the process occurring when cycle abnormality is detected of S902, similarity is determined by performing data comparison similarly to Example 2, as a result, when the difference between the data fields is small, a process such as a similar transfer process may be performed. By doing so, it becomes possible to determine the necessity of transfer of a data frame after comparing the contents of the data during the short cycle detection, and it is possible to prevent unauthorized transfer and erroneous detection of the data frame.

Example 4

In the examples described here, examples have been described in which any of the ECU or the GW performs the cycle determination, however, in Example 4, an example will be described in which the ECU 302 that actually receives data performs a cycle determination and prevents unauthorized data processing. Although the configuration example of the ECU 302 in Example 3 is similar to the configuration described in Example 1, with respect to the process of the control unit 501, in the process at a time of short cycle detection S104, the content of the process occurring when cycle abnormality is detected S902 and a time-out process S904 are different from Example 1.

In other words, in the time-out process 904, with respect to the data received at a short cycle, the subsequent unauthorized data is not received until the waiting time has elapsed, such that it is determined to be a disturbance in a cycle rather than spoofing attack, a process occurring when data is received at a normal time is performed on the data received by the ECU.

In the process occurring when cycle abnormality is detected S902, there is a high possibility that data of the same data ID is further received after data is received at a short cycle and spoofing attack is occurring, such that the ECU that has received the data discards the received data without performing the process occurring when data is received at a normal time.

By performing control in this manner, if it is determined that the ECU 302 receives spoofing data, it is possible to prevent the unauthorized operation from being performed.

Example 5

In Example 5, the abnormality-related information has been recorded as the abnormality-related information log 506 at the time of abnormality occurrence detection, after the abnormality occurs, the user is notified of the abnormality by using the abnormality-related information that has been recorded, or different processes are performed depending on the number of abnormality occurrences.

In Example 5, abnormality-related information recorded in the cycle abnormality log information 506 is read at a certain timing when the control unit 501 is started, ended, or diagnosed, and similarly to message information output by the abnormality notification process described above, the abnormality-related information is output to the output device 6 through the communication channel, such that it is possible to check the abnormality-related information after cycle abnormality occurs.

In addition, in the process occurring when abnormality is detected, since the message information is output by the abnormality notification process described above only when the number of abnormality occurrences is a predetermined value (for example, 10 times), even if an erroneous determination is made in the cycle determination and the similarity determination processes, it is possible to prevent from misleading users caused by immediately generating warning.

In Example 1 to Example 5 described above, with respect to the identifiers (ID) which are targets of fraud detection, not only the identifiers of all pieces of data on the network may be targets, but also data of a specific identifier may be focused and targets of fraud detection. Specifically, a process of limiting a reception target only to specific data IDs is performed in the data reception process by the communication I/F 402 described above. By limiting the targets of fraud detection, it becomes possible to reduce the processing load in the processor 401, and also to save a data receiving area of the communication I/F 402: resources be used for fraud detection such as a mailbox.

In addition, for example, automotive safety integrity level (ASIL) of the function associated with data as the importance degree of data is registered in advance in the filter table 504, and only data having a high importance degree of ASIL A or more may be the targets of fraud detection.

Further, when the targets of fraud detection are focused on data of a specific identifier, the targets of fraud detection may be changed periodically. Specifically, a process of sequentially switching specific data IDs which are reception targets is performed in the data reception process by the communication I/F 402 described above. When for example, the number of identifiers of the targets of fraud detection is constrained to ten types by resource constraints, and the number of types of the identifier on the network is 30, it is possible to detect fraud while saving resources, by changing the identifiers to be processed in three patterns by ten types by switching the table in which the identifiers of the targets of fraud detection are registered at a certain timing. Further, it is possible to easily perform the fraud detection for the data having a high importance degree while saving resources, by scheduling the switching of patterns such that fraud is detected for the data having a high importance degree for a long time, depending on the importance degree of the data.

According to the examples described above, a case is detected where data is transmitted at a short cycle due to unauthorized attacks, and it becomes possible to perform notification of abnormality occurrences, destruction of data, and the fail-safe execution of a system. As a calculation method for the short cycle, it becomes possible to prevent the occurrence of erroneous detection by using the fixed value and the previous reception error, for the margin of the cycle.

Further, when cycle abnormality occurs, it becomes possible to prevent erroneous detection due to cycle abnormality, by determining whether or not there is an unauthorized attack by comparing the contents of respective pieces of data, and it is possible to reduce the processing load of the data comparison by comparing the contents of data only when the cycle abnormality occurs.

Further, when the cycle abnormality detected, it is possible to notify the user or the like of the fraud occurrence and the detailed information, by notifying an output device or an external system or the like of the abnormality occurrence and message information including various types of abnormality-related information. Further, information is saved, and thus it becomes possible to check the information of when the fraud has occurred in the past.

Further, it is possible to prevent transfer of data of which cycle is abnormal due to an unauthorized attack, and the like, at a time of data transfer in the GW, and the like. It is possible to prevent the reception and processing of unauthorized data, at a time of data processing in the ECU.

REFERENCE SIGNS LIST

1 CONTROL SYSTEM
2 NETWORK SYSTEM
3 WIRELESS COMMUNICATION UNIT
4 NETWORK SYSTEM
5 WIRED COMMUNICATION UNIT
6 OUTPUT DEVICE
301 NETWORK BUS
302 ECU
303 GATEWAY (GW)
401 PROCESSOR
402 COMMUNICATION I/F
403 TIMER
404 ROM
405 RAM
406 INTERNAL BUS
501 CONTROL UNIT
502 COMMUNICATION MANAGEMENT UNIT
503 TIME MANAGEMENT UNIT
504 FILTER TABLE
505 RECEPTION TIME TABLE
506 ABNORMALITY-RELATED INFORMATION LOG
1000 DISPLAY
1001 MESSAGE INFORMATION

The invention claimed is:

1. A network device of a vehicle, the network device comprising:
a network interface communicatively coupled to one or more Electronic Control Units via a network bus, wherein each of the one or more Electronic Control Units controls a system of the vehicle using the network bus;
a memory; and
a processor communicatively coupled to the memory and the network interface;
wherein the processor:
receives, via the network interface, a plurality of data frames from the one or more Electronic Control Units, wherein the plurality of data frames includes a first data frame and a second data frame and each of the plurality of frames includes an identifier,
records, in the memory, a reception time for each of the plurality of data frames,
determines, for each of the plurality of data frames, a cycle from a plurality of cycles based on the reception time,
on a condition that the first data frame and the second data frame are received within a waiting time, have a same identifier and the cycle of the first data frame is shorter than cycle of the second data frame, determines that an abnormality is detected and performs a defensive operation against the abnormality,
on a condition that the first data frame and the second data frame have the same identifier and the second frame is not received within the waiting time, allows the first frame to traverse the network bus.

2. The network device according to claim 1, wherein the processor further:
on a condition that the first data frame and the second data frame are received within a waiting time and have the same identifier, obtains a difference between the first data frame and the second data frame,
on a condition that the difference is out of range, determines that the abnormality is detected and performs the defensive operation against the abnormality,
on a condition that the difference is within the range, allows the first data frame and the second data frame to traverse the network bus.

3. The network device according to claim 1, wherein the defensive operation includes at least one of fail-safe, unauthorized transfer prevention, disposal of data, recording of a state, and notifying a user or other systems of warning.

4. The network device according to claim 3,
wherein the processor further stores in the memory, abnormality-related information for at least one of the first data frame, and the second data frame for which the abnormality is detected, wherein the abnormality-related information includes any one or more pieces of information among an identifier for which cycle abnormality is detected, a number of cycle abnormality occurrences, a time of occurrence of cycle abnormality, and a bus ID for which cycle abnormality is detected, as abnormality-related information.

5. The network device according to claim 4, further comprising:
a user warning unit that outputs warning information,
wherein the processor, when the abnormality is detected, transmits the abnormality-related information to the user warning unit, as a warning indication,
and the user warning unit gives warning based on the warning indication.

6. A communication system of a vehicle, the system comprising:
a plurality of electronic control units, wherein each of the electronic control units control one or more of the system of the vehicle;
a gateway communicatively coupled to the plurality of electronic control units via network buses, wherein the gateway includes:
a network interface communicatively coupled to the network buses,
a memory, and
a processor communicatively coupled to the memory and the network interface;
wherein the processor of the gateway:
receives, via the network interface, a plurality of data frames from the one or more Electronic Control Units, wherein the plurality of data frames includes a first data frame and second data frame and each of the plurality of frames includes an identifier,
records, in the memory, a reception time for each of the plurality of data frames,
determines, for each of the plurality of data frames, a cycle from a plurality of cycles based on the reception time,
determines a cycle duration for each of the plurality of data frames,
on a condition that the first data frame and the second data frame are received within a waiting time, have a same identifier and the cycle of the first data frame is shorter than cycle of the second data frame, determines that an abnormality is detected and performs a defensive operation against the abnormality,
on a condition that the first data frame and the second data frame have a same identifier and the second frame is not received within the waiting time, allows the first frame to traverse the network buses.

7. The communication system according to claim 6, wherein the defensive operation includes at least one of fail-safe, unauthorized transfer prevention, disposal of data, recording of a state, and notifying a user or other systems of warning.

* * * * *